United States Patent [19]
Flotow et al.

[11] Patent Number: 4,953,680
[45] Date of Patent: Sep. 4, 1990

[54] CLUTCH ADJUSTER

[75] Inventors: Richard A. Flotow, Butler; Patrick M. Sullivan, Auburn, both of Ind.

[73] Assignee: Dana Corporation, Toledo, Ohio

[21] Appl. No.: 330,234

[22] Filed: Mar. 29, 1989

[51] Int. Cl.⁵ .................. F16D 11/00; F16D 13/75
[52] U.S. Cl. ..................... 192/111 B; 192/70.25; 411/121
[58] Field of Search .............. 192/111 B, 70.25, 70.24; 74/528, 531; 411/121, 81, 974, 516

[56] References Cited

U.S. PATENT DOCUMENTS

| | | | |
|---|---|---|---|
| 426,485 | 4/1890 | Whiteley | 403/123 |
| 431,705 | 7/1890 | McCarthy | 411/102 |
| 437,276 | 9/1890 | Bauer | 411/143 |
| 447,967 | 3/1891 | Moncrief | 192/70.28 |
| 682,876 | 9/1901 | IMartin | 411/121 |
| 793,088 | 6/1905 | Pariso | 411/121 |
| 1,016,427 | 2/1912 | Morse | 192/70.12 |
| 1,063,998 | 2/1912 | Morse | 192/70.12 |
| 1,711,600 | 5/1929 | Holmes | 192/111 B |
| 1,782,880 | 11/1930 | Pearmain | 192/70.25 |
| 1,963,364 | 6/1934 | Hazelton et al. | 192/99 R |
| 2,057,876 | 10/1936 | Berry | 192/84 |
| 2,077,704 | 4/1937 | Pearmain | 192/70.25 |
| 2,086,954 | 7/1937 | Fawick | 192/111 B |
| 2,095,816 | 10/1937 | Johansen | 192/111 B |
| 2,409,013 | 10/1946 | Bodnner | 192/111 B |
| 2,758,691 | 8/1956 | Palm | 192/111 B |
| 2,874,816 | 2/1959 | Dehn | 192/111 B |
| 4,285,424 | 8/1981 | Sink et al. | 192/111 B |

*Primary Examiner*—Richard Lorence
*Assistant Examiner*—Andrea Pitts
*Attorney, Agent, or Firm*—F. B. McDonald

[57] ABSTRACT

A clutch adjuster adapted to compensate for clutch disc wear incorporates a spring lock which in a first position secures the adjuster against rotation. On application of a disengagement force, the lock is deflected to a second position, wherein the adjuster is free for rotation. In one preferred form, the lock has an aperture which engages a bolt head on the adjuster, and upon application of the force the lock is axially displaced from the bolt head. In a second preferred form, a disc spring is adapted to normally retain the bolt head axially away from a clutch cover in a first, secured, position. Upon application of force, the bolt head is depressed against the disc spring to shift the adjuster to a second position wherein the bolt head is free for rotation.

8 Claims, 2 Drawing Sheets

CLUTCH ADJUSTER

BACKGROUND OF THE INVENTION

This invention relates to vehicular friction clutches of the type having an adjusting ring in mesh with a manually operated adjustment gear. More particularly, this invention relates to apparatus for securing an adjustment gear against unintentional rotation.

Many friction disc clutches used in heavy trucks contain clutch adjusters to compensate for friction disc wear. Numerous locking devices are available for the clutch adjusters used. Most, however, involve a lock strap system which requires loosening and removal, or, at a minimum, loosening and swinging away, of the lock strap as a prerequisite for manually operating the adjustment mechanism. Ideally, an adjuster would be designed for use without necessity of loosening and or removal of the lock strap.

SUMMARY OF THE INVENTION

The invention described herein is a clutch adjuster which requires no loosening or removal steps in its operation and securement. In a preferred form, a spring lock contains an aperture having a contour or shape adapted to engage a specific portion of the clutch adjuster mechanism. Upon depressing the spring lock, for example by means of a socket wrench, the lock is displaced from its locking position, and the adjuster may then be freely rotated. Upon release of the socket wrench, the spring lock returns to its normally engaging position, and the adjuster becomes locked against rotation. Such efforts are achieved entirely without detachment or loosening of any portion of the spring lock.

DETAILED DESCRIPTION OF THE PREFERRED EMBODIMENTS

Figure 1:
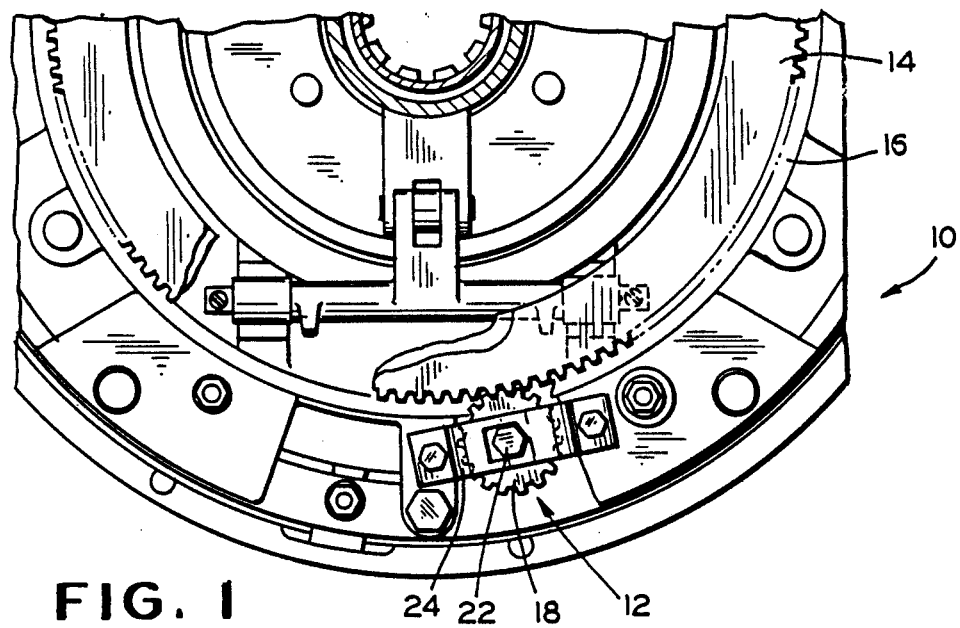
FIG. 1 is a cross-sectional fragmentary view of a vehicular friction disc clutch containing a clutch adjuster which incorporates a preferred embodiment of the spring lock device of the present invention.

Referring to FIG. 1, a fragmentary view of a portion of a friction disc clutch 10 is displayed. The friction disc clutch 10 incorporates a first preferred embodiment of a clutch adjuster 12, constructed in accordance with the present invention. The adjuster 12 includes a rotary gear 18 which meshes with a clutch adjusting ring 14 as shown. The adjuster 12 is secured to the clutch cover 16.

Figure 3:
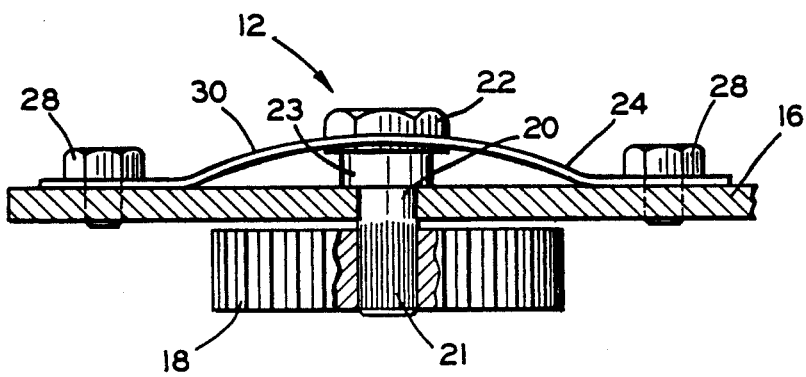
FIG. 3 is a view along lines "3—3" of FIG. 2.
Figure 2:
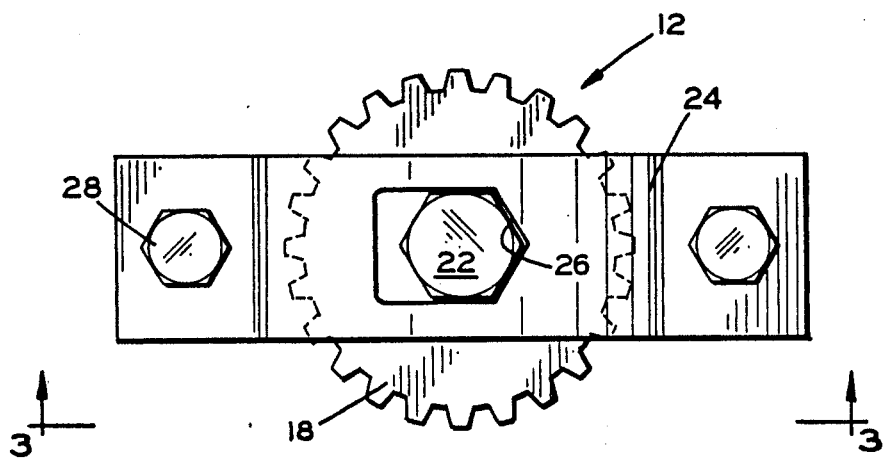
FIG. 2 is an enlarged view of the clutch adjuster of FIG. 1.

Referring to FIGS. 2 and 3, the adjuster 12 includes the rotary gear 18, secured by a press fit to an adjuster shaft 20 having a knurled end 21. The shaft 20 has an integral bolt head 22, and a spring lock 24 is positioned over the bolt head 22 for normal securement of the head, hence of the adjuster 12, against inadvertent rotation. The spring lock 24 (FIG. 2) has an aperture 26 adapted to surround and to engage the bolt head when the lock 24 is in its normally unrestrained position. The spring lock is secured to a portion of the cover 16 by fasteners 28. The central portion of the spring lock 24 contains the aperture 26, and is bowed concavely with respect to the cover portion 16 as shown at 30 (FIG. 3).

Figure 4:
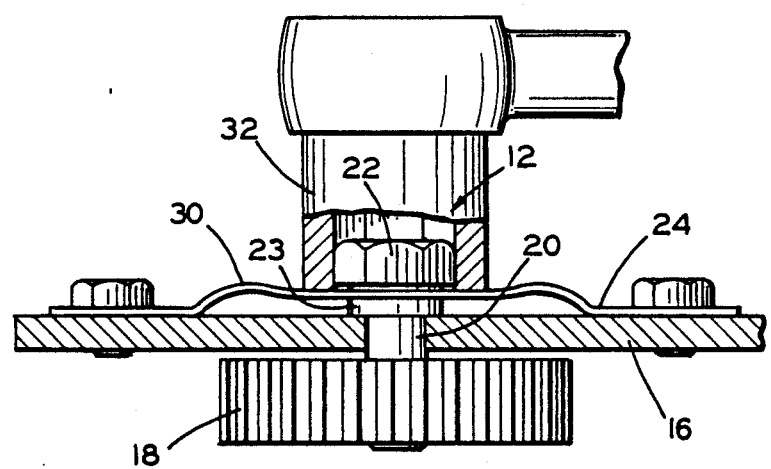
FIG. 4 is a view similar to FIG. 3, wherein a socket wrench head has been applied against the spring strap with a force depress the strap.

Referring to FIG. 4, it will be appreciated by those skilled in the art that a tool such as the head of a socket wrench 32 (shown fragmentarily) is used to displace the bowed portion 30 of the spring lock 24 down and away from the head 22. During the application of such disengagement force, the socket wrench may be used to rotate the bolt head 22. The head 22 of the adjuster 12 thus rotates the rotary gear 18, which in turn rotates the adjusting ring 14 (FIG. 1). An integral spacer 23 under the bolt head 22 allows the spring lock to clear the head 22 to permit rotation of the head. In the preferred form, the lock 24 is made of spring steel having a gauge thin enough that, when depressed, the portion 30 will simply bulge outwardly on each side of the bolt head 22. Thus, there is no need to provide slots at the bolts 28 to permit any axial sliding movement of the lock 24.

Figure 5:
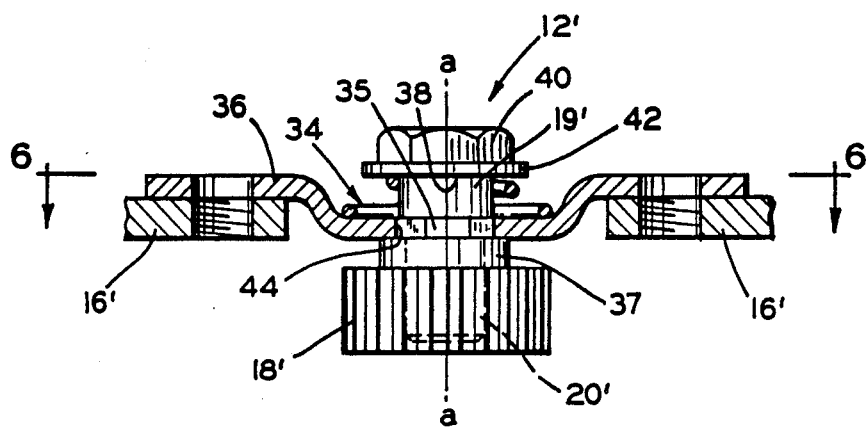
FIG. 5 a cross-sectional view of an alternate preferred embodiment of present invention.
Figure 6:
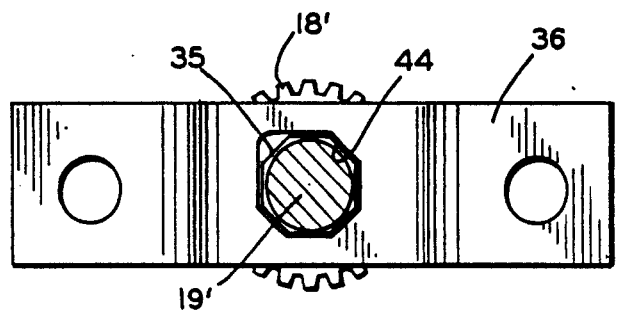
FIG. 6 a view along lines "6—6" of FIG. 5.

Referring to FIGS. 5 and 6, a second preferred embodiment 12' of the clutch adjuster incorporates a modified spring lock system.

Specifically, the second preferred embodiment employs a disc spring such as the conical coil spring 34 positioned between a locking bracket 36, and the underside 38 of a specially adapted bolt head 40. The bracket 36 is secured to a clutch cover 16' by fasteners (not shown). In the second embodiment, the bolt head 40, a specially contoured shaft 20', and gear 18', all move axially along an axis "a—a" normal to the locking bracket 36. The special bolt head 40 incorporates a flange 42 which retains the tool, such as a socket wrench 32 (See FIG. 4), from extending beyond the bolt head 40. The flange 42 acts as a socket stop, and the wrench 32 is thus effective to apply a force to the bolt head 40, depressing the disc spring 34 toward the locking bracket 36 for disengagement of the specially contoured shaft 20'.

Referring now to FIG. 6, it will be appreciated by those skilled in the art that the shaft 20' will contain a portion 35 having a non-circular shape corresponding to the aperture 44 of the locking bracket 36, as shown. Other shapes may also be used. When the head 40, hence the adjuster 12', is in a first position, the portion 35 will engage the aperture 44 to restrict the shaft 20' against rotation. A boss 37 on the gear 18' limits retraction of the head 40 in the first position. Whenever the head 40 is depressed against the disc spring 34 under sufficient disengagement force, the portion 35 will become axially displaced downwardly from the aperture 44, and the bolt head 40 will then be free to rotate during continued application of the force. A shaft portion 19' immediately under the head 40 has a size and shape, preferably circular, which does not engage the aperture 44 when the bolt head 40 is axially displaced to its downward, or second, position.

In its preferred form, the second embodiment of the invention (FIGS. 5 and 6) has a displacement range of approximately one-quarter of one inch between first and second positions. The ring gear has a thickness of one-half to five-eighths of an inch, so that there is no chance that the gear 18' will become axially disengaged from the adjusting ring.

Finally, it is envisioned that the disengagement force in either embodiment would be no more than approximately fifteen pounds. Also, those skilled in the art will appreciate that there are slight variations which will work equally as well as those presented. As one example, in lieu of the locking bracket 36, the aperture 44 could alternatively be cast directly into the cover 16'. As a second example, a Belleville disc spring could be used in lieu of the conical coil spring of FIG. 5.

Although only two preferred embodiments have been generally described herein, the following claims are envisioned to cover numerous other embodiments which fall within the spirit and scope of this invention.

What is claimed is:

1. In a clutch adjuster adapted to compensate for disc wear in a friction clutch including a cover and an adjusting ring rotatable relative to said cover, said adjuster including a rotatory gear supported by said cover, said rotary gear in mesh with said adjusting ring, said adjuster further including an adjuster shaft extending through said cover and having one end thereof fixed to said rotary gear, said shaft having means external to said cover for rotating said shaft, by which means said rotary gear and said adjusting ring are also rotated; an improvement comprising: resilient means positioned external to said cover, said resilient means adapted to secure said adjuster against rotation in a first, unrestrained position, wherein aid adjuster may be freely rotated whenever said resilient means is biased to a second position by application of a disengagement force by depressing said resilient means wherein said means external to said cover for rotating said adjuster shaft comprises a bolt head on said shaft, wherein said resilient means is fixed to said cover for securing said adjuster, and wherein said means comprises a spring lock including an aperture sized and positioned for surrounding and engaging said bolt head in said normally unrestrained first position, said lock thus being adapted to restrain said bolt head against rotation.

2. The clutch adjuster of claim 1 wherein said spring lock is disposed in a concave position with respect to said cover, wherein said disengagement force displaces said lock axially along said adjuster shaft, wherein when said aperture is urged out of engagement with said bolt head, and said head is free for rotation.

3. In a clutch adjuster adapted to compensate for disc wear in a friction clutch including a cover and an adjusting ring rotatable relative to said cover, said adjuster including a rotary gear supported by said cover, said rotary gear in mesh with said adjusting ring, said adjuster further including an adjuster shaft extending through said cover and having one end thereof fixed to said rotary gear, said shaft having means external to said cover for rotating said shaft, by which means said rotary gear and said adjusting ring are also rotated; an improvement comprising: resilient means positioned external to said cover, said means adapted to secure said resilient adjuster against rotation in a first, unrestrained position, wherein said adjuster may be freely rotated whenever said resilient means is biased to a second position by application of a disengagement force, wherein said means external to said cover for rotating said adjuster shaft comprises a bolt head on said shaft, wherein said resilient means adapted to secure said adjuster comprises a conical spring positioned between said cover and said bolt head to normally urge said bolt head axially away from said cover in said first position.

4. The clutch adjuster of claim 3 wherein said adjuster shaft includes a portion spaced from said bolt head having a non-circular shape, and wherein said cover portion has an aperture sized and positioned for surrounding and engaging said non-circular portion of said adjuster shaft, wherein said aperture has a contour adapted to restrain said adjuster shaft against rotation in said first position.

5. The clutch adjuster of claim 4 wherein said adjuster head and shaft are axially movable under application of said disengagement force, and wherein under said force, said non-circular shaft portion is displaced from said aperture, and said adjuster head and shaft are free for rotation.

6. The clutch adjuster of claim 5 wherein said conical spring is disposed in a concave position with respect to said exterior of said cover.

7. The clutch adjuster of claim 6 wherein said bolt head comprises a socket stop.

8. The clutch adjuster of claim 7 wherein said cover portion comprises a locking bracket fixed to said clutch cover.

* * * * *